United States Patent [19]
Schmidt

[11] Patent Number: 4,878,467
[45] Date of Patent: Nov. 7, 1989

[54] SINGLE- OR MULTIPLE-PART PROTECTIVE COVER FOR TRACTION DRIVES

[76] Inventor: Konrad Schmidt, Ringstrasse 12, D-8501 Tuchenbach, Fed. Rep. of Germany

[21] Appl. No.: 103,717

[22] Filed: Oct. 2, 1987

[30] Foreign Application Priority Data

Sep. 17, 1986 [DE] Fed. Rep. of Germany ....... 3631517

[51] Int. Cl.⁴ .............................................. F01P 5/06
[52] U.S. Cl. .............................. 123/195 C; 123/198 E; 74/606 A
[58] Field of Search ............ 123/195 C, 198 E, 90.31; 74/606 A; 180/229, 230, 68.1, 68.2; 474/93, 146

[56] References Cited

U.S. PATENT DOCUMENTS

| | | | |
|---|---|---|---|
| 3,951,114 | 4/1976 | Fachbach et al. | 123/195 C X |
| 4,155,333 | 5/1979 | Maggiorana | 123/90.31 X |
| 4,169,512 | 10/1979 | Ishikawa et al. | 123/198 E X |
| 4,631,977 | 12/1986 | Kawashima | 74/606 A |
| 4,697,665 | 10/1987 | Eastman et al. | 123/195 C X |
| 4,733,639 | 3/1988 | Kohyama et al. | 180/229 X |

FOREIGN PATENT DOCUMENTS

| | | |
|---|---|---|
| 1142090 | 1/1963 | Fed. Rep. of Germany . |
| 1182008 | 11/1964 | Fed. Rep. of Germany . |
| 2051050 | 11/1972 | Fed. Rep. of Germany . |
| 2942712 | 8/1982 | Fed. Rep. of Germany . |
| 3201217 | 12/1983 | Fed. Rep. of Germany . |
| 2502720 | 10/1982 | France . |

Primary Examiner—Willis R. Wolfe

[57] ABSTRACT

In a single- or multiple-part protective cover for traction drives (for instance, chain, belt, toothed belt drives or the like), in particular for vehicle engines, vehicle drives, machines or the like, a protection of the traction drive from impairment by excessive heating during operation and from the entry of dirt particles, rainwater, snow and other foreign bodies is attained in that at least one coolant overpressure inlet opening (2) is embodied in the walls of the protective cover (1) and communicates with at least one source emitting the pre-filtered coolant at overpressure. As a result, a gaseous coolant such as air or the like can be introduced, either permanently or temporarily, by means of a source embodied as a turbocompressor or pump or relative wind intercepting device, into the interior of the protective cover, as a result of which, first, sufficient cooling of the traction drive and, second, the formation of an overpressure in the interior of the protective cover are effected, the latter preventing the entry of any dirt particles or the like. By means of the invention, the functional capacity of the traction drive is improved substantially, and the service life of the individual components, and in particular of the traction means, is substantially increased.

23 Claims, 5 Drawing Sheets

SINGLE- OR MULTIPLE-PART PROTECTIVE COVER FOR TRACTION DRIVES

BACKGROUND OF THE INVENTION

1. Field of the Invention

The invention relates to a single- or multiple-part protective cover for traction drives such as chain, belt, toothed belt drives or the like, in particular for which engines, vehicle drives, machines or the like, having at least one inlet opening disposed in the protective cover, through which opening a gaseous medium can enter into an inner chamber containing the traction drive.

2. The Prior Art

From Examined German Patent Application DE-AS 11 42 090, it is known to surround a belt drive at least partly with a protective hood.

It is also known from Examined German Patent Application DE-AS 20 51 050 to provide a housing assembled from a multiplicity of half-shells in order to fully encapsulate traction drives, such as chain and belt drives.

From Examined German Patent Application DE-AS 11 82 008, it is known to blow cooling air generated by a fan onto pulleys in drive mechanisms.

In an apparatus for sealing an annular gap between a housing and a rotating structural component by means of a radial sealing ring having inwardly oriented sealing lips, the pressing force of which is variable with a control means by means of a fluid acting upon the sealing lips, it is also known, from German Patent 29 42 712, to make the interiors of closed housings for motor vehicle transmission system parts, for instance a variable-speed gear, a secondary drive and the front and rear axle, communicate with a source of compressed air or a vent means selectively, by means of a switch. As a result, the pressing force by the sealing lips can be temporarily increased by the imposition of compressed air, so that the sealing can be adapted to the particular operating conditions. The temporarily increased pressing force is also intended to prevent the penetration of dirt and water into the housing in the most unfavorable conditions.

Finally, it is already known from German Patent 32 01 217 to feed and vent air to and from a drive housing continuously through a ventilating device communicating with its interior; this is intended to assure that on the one hand no liquid such as rainwater or the like can penetrate the interior of the drive housing from outside, and on the other hand to assure that as little splashing oil as possible can escape to the outside.

It is moreover known for a toothed belt drive in motor vehicle engines, which substantially comprises a toothed pulley driven by a crankshaft of the vehicle, a driven toothed pulley connected to the camshaft, an idler pulley and a drive belt embodied as a toothed belt, to be shielded by means of a protective hood or cover, which is for instance secured to the front face end of the engine block.

It has been found in practice that during the operation of a toothed belt drive of this kind, especially if it is used in high-speed engines, considerable problems arise in terms of the temperature behavior and hence the strength of the belt, which is for instance made of a synthetic elastomeric material. These problems can be ascribed to the fact that where the protective cover is embodied as completely tight, i.e. as virtually a completely encapsulated housing, impacts and the like during belt operation, and in particular toothed belt operation, cause marked warming and in fact heating of this component inside the protective cover, with the attendant danger that the material comprising the belt will overheat, thus severely impairing its strength and causing it to diminish rapidly.

On the other hand, if a protective cover is provided which in order to avoid or reduce thermal problems is not completely tight, and therefore is an at least partly open housing, then the disadvantage arises that complete protection for the toothed belt drive is not assured, for instance because of the draft-creating effect of the rotating parts, and so dirt particles, rainwater, snow and the like can penetrate farther into the interior of the protective cover and thus likewise damage or even destroy the toothed belt.

A protective cover having the characteristics of the preamble to claim 1 is also known from French Patent Application 25 02 720.

It is the object of the invention to devise a protective cover that is substantially improved over the prior art as defined by French Patent Application 25 02 720, and that not only assures excellent permanent cooling of all the components of the traction drive, but moreover and at the same time assures maximum possible protection of the traction drive from impairment by dirt particles, rainwater or other foreign bodies, which precisely in the embodiment of the protective housing defined by French Patent Application 25 02 720 do after all enter through the air inlet openings of that housing to reach the interior of the protective cover, especially because of the suction exerted by the rotating parts and fan blades provided there, where they finally can damage, if not even destroy the gear parts, especially the toothed belt.

SUMMARY OF THE INVENTION

This object is attained in accordance with the invention in that the inlet opening or openings are each embodied as coolant overpressure inlet openings in the wall of the protective cover, and communicate with at least one source that produces the pre-filtered coolant at overpressure.

By means of the invention it is attained in a both simple and extremely effective manner that in the interior of the protective cover containing the traction drive, a permanent overpressure of the pre-filtered coolant that is emitted by the source and introduced into the aforementioned interior is built up and maintained. Because of the simultaneously attained cooling effect, which is substantially increased as compared with the prior art defined by French Patent Application 25 02 720, in particular with respect to the drive belt, for instance a toothed belt in the traction drive involved, its overheating and especially an excessive belt expansion is virtually completely avoided; as a result, when used in high-speed motors, for instance, such as vehicle engines, the further advantage is also attained that substantially more-exact control times are possible with respect to the instance of inlet and outlet of the engine valves, and hence with a corresponding arrangement of the ignition system, substantially more-exact instance of ignition are also attained. This effect finally results in fuel savings and thus in a reduction of the toxic substances that are emitted along with the exhaust gases, which especially with motor vehicle engines represents a particularly valuable advantage.

Furthermore, in the protective cover according to the invention, as a result of the permanent or even temporary introduction of the coolant furnished by the source, which is prefiltered and is at overpressure, the entry of any foreign bodies, dirt particles, rainwater or the like farther into the interior formed by the walls of the protective cover is virtually completely prevented, so that possible damage to the components of the traction drive is as good as precluded.

Advantageous further embodiments of the invention will become apparent from the dependent claims.

In summary, it can be stated that a single-or multiple-part protective cover embodied in accordance with the invention, in particular for traction drives, is usable in combination with high-speed motors, such as motor vehicle engines, but furthermore can be used in all areas in which traction drives require excellent protection against impairment from dirt particles and similar foreign bodies, as is especially the case with toothed belt drives, in which overheating of the drive parts, and in particular of the belt, must furthermore be avoided.

BRIEF DESCRIPTION OF THE DRAWINGS

For further explanation of the invention, its advantages and further characteristics, the enclosed drawing is provided. In the context of an exemplary embodiment, the drawings show.

DETAILED DESCRIPTION OF THE PREFERRED EMBODIMENTS

Figure 1:
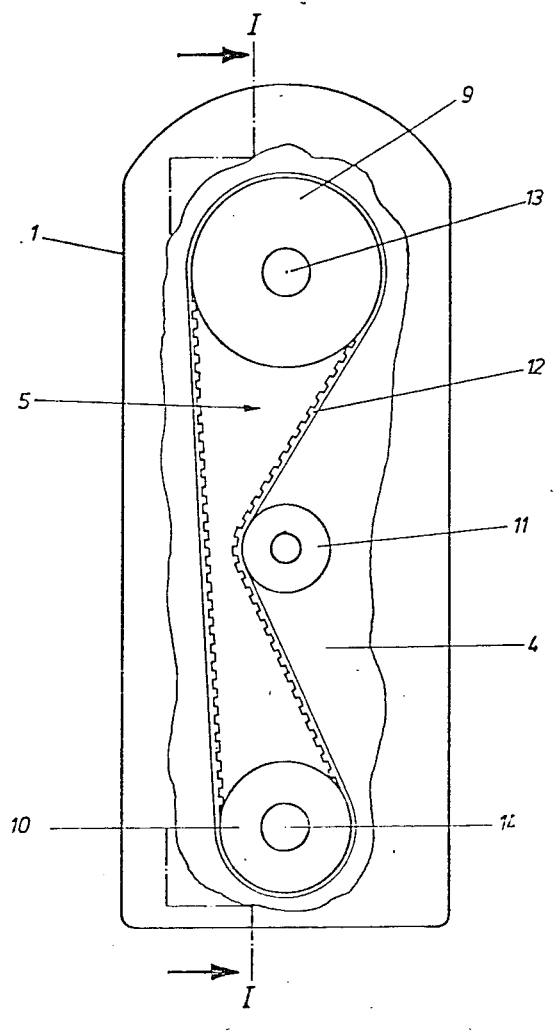
FIG. 1, a schematic front view of a toothed belt drive for a motor vehicle engine, the toothed belt drive being covered by a protective cover that is shown in cutaway form in FIG. 1.

As shown in FIG. 1, a toothed belt drive 5 covered by a protective cover 1, for instance embodied in one part, substantially comprises a pulley 9 connected to a camshaft 13, a pulley 10 connected to a crankshaft 14, a toothed belt 12, and an idler pulley 11.

In FIG. 1, the protective cover 1 is shown partly cutaway on the front, to allow a view of the toothed belt drive 5.

Figure 2:
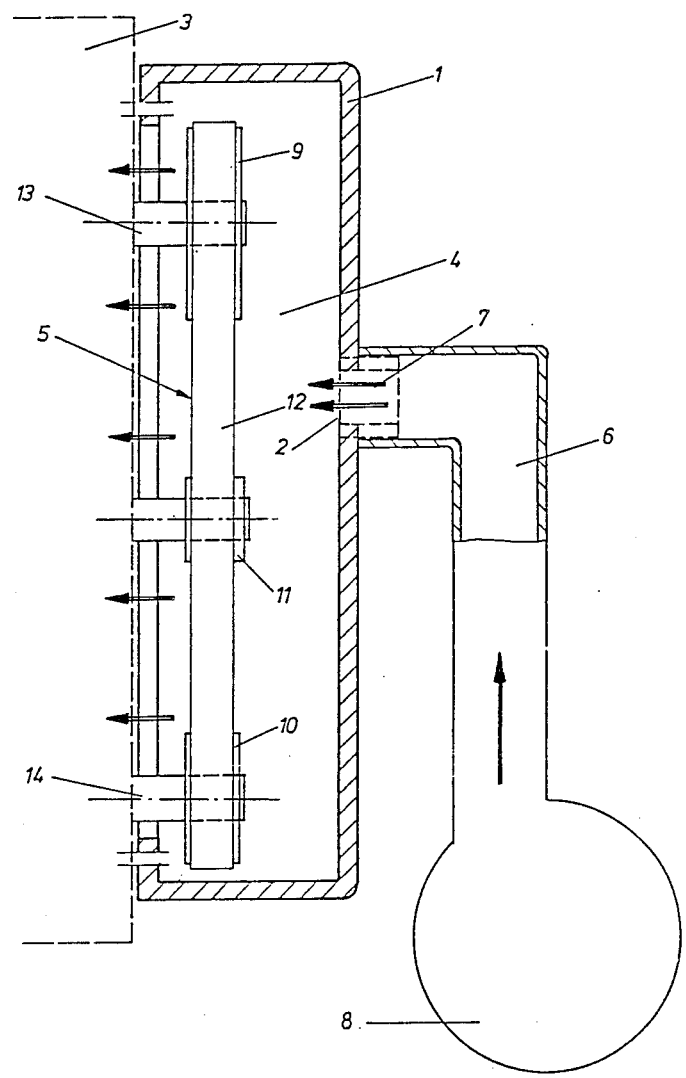
FIG. 2, as partial sectional view of the arrangement of FIG. 1 taken along the line I—I.

In FIG. 2, this toothed belt drive is visible from the side, the protective cover 1 having been cut along the line I—I of FIG. 1. The protective cover 1 is for instance secured to a front face end of a schematically shown engine block 3, thereby together with the wall of the protective cover 1 forming an interior 4 in which the toothed belt drive 5 is located.

On the front end of the protective cover 1 remote from the engine block 3, in the wall at that point, an inlet opening 2 is provided, embodied as a coolant overpressure inlet opening. This inlet opening 2 in the present exemplary embodiment serves to introduce a flow of air into the interior 4, this flow of air being generated by a turbocompressor 8, such as a radial blower. In the vicinity of the inlet opening 2, the protective cover 1 is provided with an outwardly protruding connector 7, with which a line 6 communicates with its one end, while the other end of this line 6 leads to the turbocompressor 8.

By means of the airflow supplied via the line 6 to the interior 4 of the protective cover 1, this interior as well as the toothed belt drive 5 it contains is constantly cooled, and at the same time a substantially permanent overpressure is generated in the interior 4, on the basis of which the entry of foreign particles, dirt, rainwater and the like into the interior 4 through any air gaps in the protective cover 1 is reliably prevented.

Figure 3:
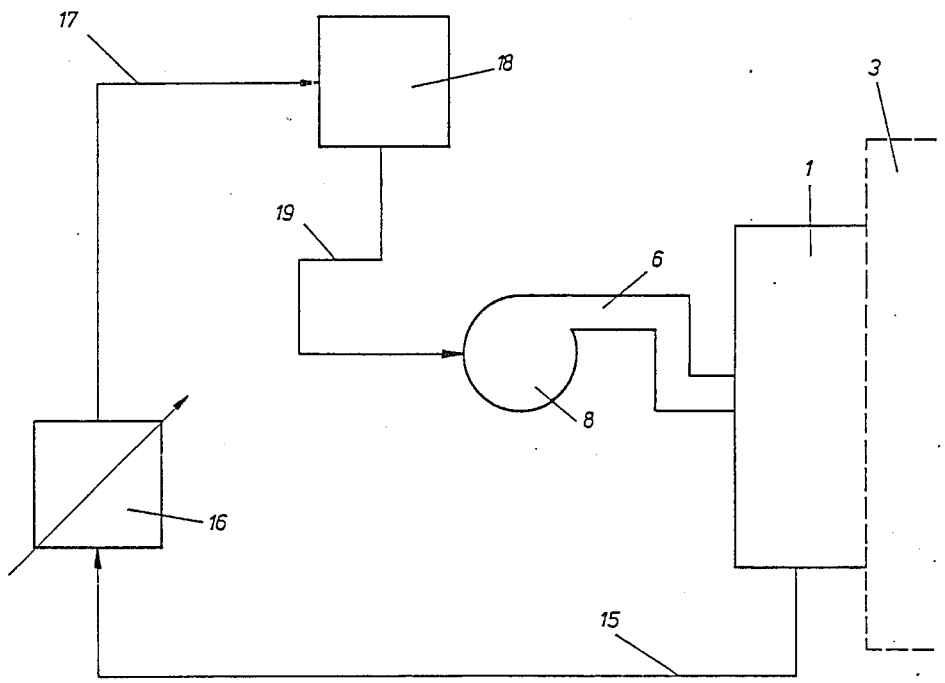
FIG. 3, a schematic view of a control loop for a drive device for a turbocompressor, which is used in combination with the protective cover according to the invention.

As FIG. 3 shows, the turbocompressor 8, which for instance may be an axial, radial, or diagonal blower, and a drive unit 18 serving to drive the turbocompressor 8 are incorporated into a closed loop (or open loop) with the aid of which a predetermined continuous overpressure is generated in the interior 4 of the protective cover 1 is accordance with FIG. 2. In this closed control loop, the protective cover 1 communicates via a measurement line 15 with a controller 16, which in turn is connected via a line 17 with the drive unit 18. The pressure prevailing in the interior 4 of the protective cover 1 is measured continuously, and the measurement value is supplied via the line 15 to the controller 16, in which a control variable is generated by means of a set-point/actual-value comparison, and this variable is imposed upon the drive unit 18 via the line 17. In accordance with this control variable, the drive is regulated or adjusted from the drive unit 18 via a line 19 leading to the turbocompressor 8 and serving to transmit power, and thus the pressure of the airflow supplied to the protective cover 1 or to the interior 4 embodied by the protective cover and by the front face end of the engine block 3 is regulated or adjusted as well.

Instead of generating the airflow by means of the turbo-compressor 8, it is also possible to utilize the relative wind arising while the vehicle is moving and to supply it via the line 6 to the interior 4. The relative wind can be intercepted here through a suitable relative wind interception device, for instance embodied as an aerodynamic inlet opening, and diverted into the line 6, by which means it is also possible to attain a desired continuous overpressure in the interior 4 containing the toothed belt drive 5.

Figure 4:
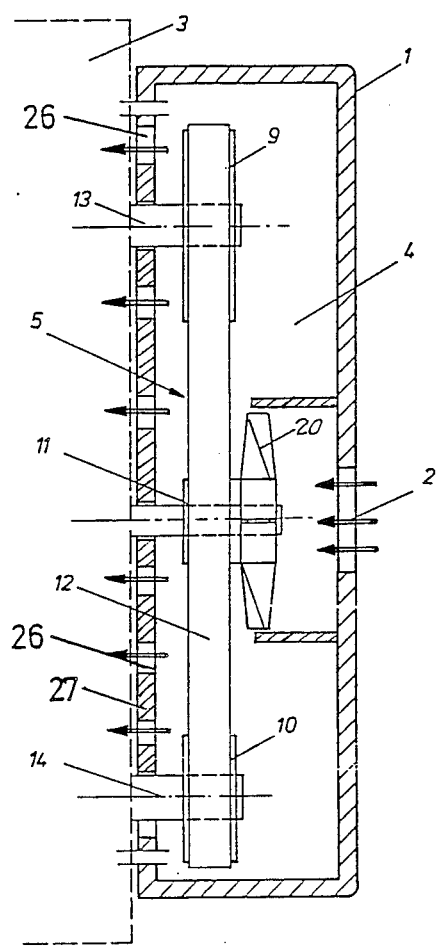
FIGS. 4 and 5, are respective further exemplary embodiments of a protective cover for a toothed belt drive, seen partly in section (in views corresponding to FIG. 2).

The exemplary embodiment of a protective cover 1 shown in FIG. 4 differs from that of FIG. 2 substantially in that the turbocompressor or pump now is no longer located outside the protective cover but rather in the interior 4 of the protective cover 1. In the exemplary embodiment of FIG. 4, the idler pulley 11 of the toothed belt drive 5 is simultaneously embodied as a turbocompressor 20 and disposed in the vicinity of the inlet opening 2 in the protective cover 1. To this end, the idler pulley 11 is provided with a compressor drive element 20, for example a compressor wheel or blower wheel, and the protective cover 1 is embodied as a compressor housing at the point corresponding with the location of the compressor drive part 20. As FIG. 4 shows, this compressor housing of the protective cover 1 surrounds the circumference of the compressor drive element 20 of the idler pulley 11.

Instead of the idler pulley, or in addition to it, the pulley 9 on the camshaft 13 or the pulley 10 on the crankshaft 14 can each simultaneously be embodied as a turbocompressor or as a pump.

Figure 5:
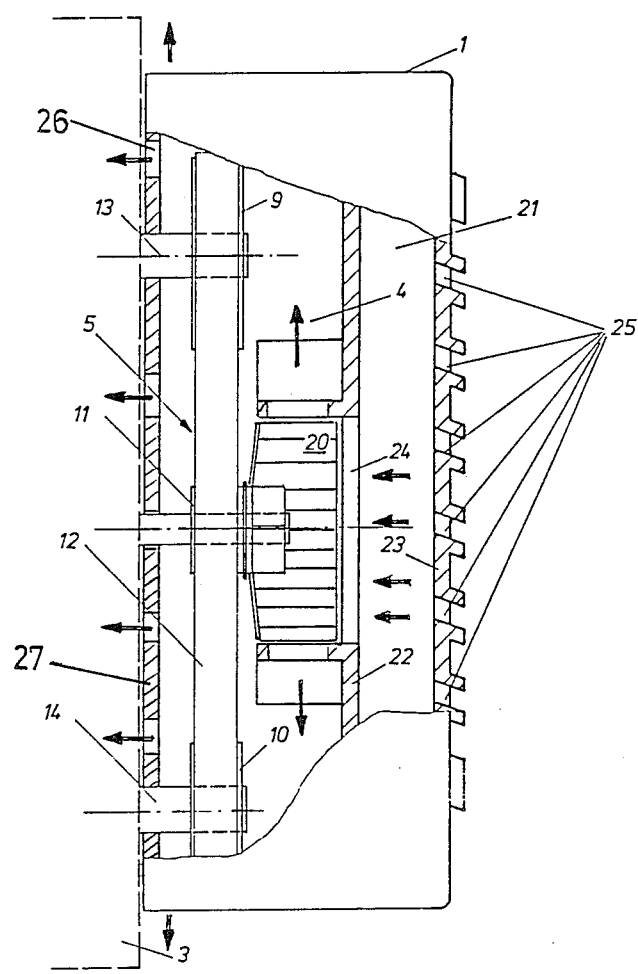

In the exemplary embodiment of FIG. 5, the protective cover 1 is embodied as double-walled; that is, it has an inner wall 22 as well as an outer wall 23, between which there is an interspace 21. The outer wall 23 has a multiplicity of inlet openings 25, for example slit-like in embodiment, for introducing the gaseous medium, that is, air, for example, which then passes through the interspace 21 to reach an inlet opening 24 in the inner wall 22. In the vicinity of this inlet opening 24 and in the interior 4 of the protective cover, there is a turbocompressor or pump 20, corresponding to the exemplary embodiment of FIG. 4. As FIG. 5 shows, in this case the idler pulley 11 is simultaneously embodied as a turbocompressor (or as a pump) and has a compressor drive element 20, which immediately adjoins the inlet opening 24, while at the point on the inner wall 22 corresponding to the location of the compressor drive element 20, the protective cover is again embodied as a compressor housing.

In order to assure a pressure equalization of the gaseous medium introduced at overpressure into the interior 4 of the protective cover 1, it is possible, as FIGS. 4 and 5 show, for one or more outlet openings 26 to be disposed in the protective cover 1, in particular in a wall portion 27 located opposite the front side of the protective cover; this wall portion 27 is for example secured to the front end of an engine block 3.

Furthermore, although not shown in detail in FIGS. 4 and 5, filters, in particular dust filters, can be disposed in the vicinity of the various inlet openings 2, 24 and 25, for which filters a connection with an air filter, for example, of an internal combustion engine can also be provided.

I claim:

1. A single- or multiple-part protective cover for traction drives, such as chain, belt, toothed belt drives, in particular for vehicle engines, vehicle drives, machines, comprising:
   at least one inlet opening disposed in the protective cover, through which opening a gaseous medium can enter into an inner chamber containing the traction drive, the at least one inlet opening being designed as an over-pressure coolant inlet opening in a wall of the protective cover;
   a line having one end connected with a corresponding one of the at least one inlet opening and having a second end connected to a source emitting the coolant medium, said source comprising a turbocompressor.

2. A protective cover as defined by claim 1, wherein the protective cover, in the vicinity of the at least one inlet opening, is provided with an outwardly protruding connector, to which the one end of the line is connected.

3. A protective cover as defined by claim 2, wherein the end of the line is joined in a detachable manner to the connector.

4. A protective cover as defined by claim 1, wherein the turbocompressor is an axial blower.

5. A protective cover as defined by claim 1, wherein the turbocompressor is a radial blower.

6. A protective cover as defined by claim 1, wherein the turbocompressor is a diagonal blower.

7. A protective cover as defined by claim 1, wherein the source is embodied as a relative wind intercepting device, which is disposed on an aerodynamically shaped surface of a vehicle.

8. A protective cover as defined by claim 7, wherein the relative wind intercepting device is an aerodynamically embodied inlet opening on the surface of the vehicle.

9. A protective cover as defined by claim 1, wherein as the turbocompressor, an accessory unit of a vehicle engine is provided, and a drive device for the turbocompressor is incorporated into a closed loop, for regulating or adjusting a predetermined continuous overpressure in the inner chamber embodied by the protective cover and containing the traction drive.

10. A protective cover as defined by claim 9, wherein as the turbocompressor, an accessory unit of a vehicle engine is provided, and a drive device for the turbocompressor is incorporated into an open loop for regulating or adjusting a predetermined continuous overpressure in the inner chamber embodied by the protective cover and containing the traction drive.

11. A protective cover as defined by claim 1, further comprising at least one turbocompressor or a pump is disposed in the inner chamber of the protective cover.

12. A protective cover as defined by claim 11, wherein the at least one turbocompressor or the pump in the inner chamber is disposed in the vicinity of at least one of the at least one inlet opening in the protective cover.

13. A protective cover as defined by claim 11, wherein the turbocompressor or the pump is coupled for driving with an idler pulley of the traction drive.

14. A protective cover as defined by claim 11, wherein the turbocompressor or the pump is coupled in terms of its drive with a camshaft of the vehicle engine.

15. A protective cover as defined by claim 11, wherein the turbocompressor or the pump is coupled in terms of its drive with a crankshaft of the vehicle engine.

16. A protective cover as defined by claim 11, wherein at least one of the idler pulley, the pulley on the camshaft, and the pulley on the crankshaft is simultaneously embodied as turbocompressors or as a pump.

17. A protective cover as defined by claim 16, wherein at least one of the idler pulley, the pulley, and the pulley has a compressor drive element, in particular a compressor wheel or blower wheel, and the protective cover, at the point located to correspond to the location of the compressor wheel, is embodied as a compressor housing.

18. A protective cover as defined by claim 11, wherein the protective cover is embodied as doublewalled, wherein a first, outer wall has at least one inlet opening for introducing the gaseous medium, while the turbocompressor or the pump is disposed in the vicinity of a further inlet opening of the inner wall of the protective cover.

19. A protective cover as defined by claim 18, wherein the at least one inlet opening are embodied in slit-like fashion in the outer wall of the protective cover.

20. A protective cover as defined by claim 1, wherein in the vicinity of the at least one inlet opening, a filter, in particular a dust filter, is provided.

21. A protective cover as defined by claim 20, wherein a communication of the at least one inlet opening with an air filter of an internal combustion engine is provided.

22. A protective cover as defined by claim 1, wherein in the protective cover, at least one outlet opening is provided for a pressure equalization of the gaseous medium introduced into the inner chamber of the protective cover.

23. A protective cover as defined by claim 22, wherein the at least one outlet opening is disposed in a wall portion opposite a front side of the protective cover.

* * * * *